(12) United States Patent
Modica et al.

(10) Patent No.: US 8,498,376 B2
(45) Date of Patent: Jul. 30, 2013

(54) METHOD AND SYSTEM FOR CERTIFYING OPERATORS OF X-RAY SYSTEMS

(75) Inventors: Peter Modica, Matawan, NJ (US); Khai Le, Huntington Beach, CA (US); Phong Nguyen, Tustin, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 13/430,995

(22) Filed: Mar. 27, 2012

(65) Prior Publication Data

US 2012/0300902 A1    Nov. 29, 2012

Related U.S. Application Data

(63) Continuation of application No. 13/023,516, filed on Feb. 8, 2011, now abandoned, which is a continuation of application No. 12/365,294, filed on Feb. 4, 2009, now Pat. No. 7,903,783, which is a continuation of application No. 11/773,735, filed on Jul. 5, 2007, now Pat. No. 7,505,557, which is a continuation of application No. 11/343,747, filed on Jan. 30, 2006, now Pat. No. 7,257,189, which is a continuation of application No. 10/067,508, filed on Feb. 4, 2002, now abandoned.

(60) Provisional application No. 60/308,510, filed on Jul. 27, 2001.

(51) Int. Cl.
    *G01N 23/00*    (2006.01)

(52) U.S. Cl.
    USPC .......... 378/57; 250/358.1; 434/219; 705/7.42

(58) Field of Classification Search
    USPC .......... 378/57; 250/358.1; 434/219; 705/7.42
    See application file for complete search history.

(56) References Cited

U.S. PATENT DOCUMENTS

| | | | |
|---|---|---|---|
| 4,366,382 A | 12/1982 | Kotowski | |
| 4,979,137 A | 12/1990 | Gerstenfeld et al. | |
| 5,243,693 A | 9/1993 | Maron | |
| 5,247,561 A | 9/1993 | Kotowski | |
| 5,590,057 A | 12/1996 | Fletcher et al. | |

(Continued)

OTHER PUBLICATIONS

"Test and Evaluation Plan for Screener Proficiency Evaluation and Reporting System (SPEARS) Threat Image Projection" J.L.Fobes, Ph.D., et al. FAA, Dec. 1995.*

(Continued)

*Primary Examiner* — Thomas R Artman
(74) *Attorney, Agent, or Firm* — Novel IP (57) ABSTRACT

A method and system for using Threat Imaging Projection (TIP) technology, and the operator testing data that it generates, in order to certify x-ray inspection system operators and thereby assure an acceptable and uniform level of operator performance. In a preferred configuration, the operator views x-ray images of objects on a screening system equipped with TIP technology. When the operator believes that a threat item image appears on the screening system, the operator indicates such via an indicating means. The system is capable of recording, storing and transmitting individual operator performance data relating to proper detections, missed detections, and false alarms, i.e., when an operator indicates that a threat item image appears when no such image actually appears on the screening system. The system preferably contains a library of various threat item images, e.g., guns, bombs, knives, etc., which are classified according to type of threat and difficulty of detection.

18 Claims, 7 Drawing Sheets

U.S. PATENT DOCUMENTS

| | | |
|---|---|---|
| 5,660,549 A | 8/1997 | Witt, III |
| 5,882,206 A | 3/1999 | Gillio |
| 6,044,353 A | 3/2000 | Pugliese, III |
| 6,137,895 A | 10/2000 | Al-Sheikh |
| 6,301,327 B1 | 10/2001 | Martens et al. |
| 6,552,346 B2 | 4/2003 | Verbinski et al. |
| 6,707,879 B2 | 3/2004 | McClelland et al. |
| 6,721,391 B2 | 4/2004 | McClelland et al. |
| 6,899,540 B1 | 5/2005 | Neiderman et al. |
| 6,901,346 B2 | 5/2005 | Tracy et al. |
| 7,257,189 B2 | 8/2007 | Modica et al. |
| 7,505,557 B2 | 3/2009 | Modica et al. |
| 2002/0045152 A1 | 4/2002 | Viscardi et al. |

OTHER PUBLICATIONS

"Revised Test and Evaluation Plan for Determining Screener Training Effectiveness" Brenda A. Klock, et al. FAA, Aug. 2000.*

"Development and Validation of a Test of X-ray Screener Readiness" Eric C. Neiderman, Ph.D., et al. IEEE, 2000.*

Rapiscan Security Products, Inc., Users Guide for Levels 1 and 2 Threat Image Protection (TIP) Users Manual, Jan. 12, 2001, document in general.

Rapiscan Security Products, Inc., Users Guide for Level 3 Threat Image Projection (TIP) System Manual, Aug. 4, 1999, document in general.

* cited by examiner

METHOD AND SYSTEM FOR CERTIFYING OPERATORS OF X-RAY SYSTEMS

CROSS REFERENCE TO RELATED APPLICATIONS

This application is a continuation of U.S. patent application Ser. No. 13/023,516, filed Feb. 8, 2011 now abandoned which is a continuation of U.S. patent application Ser. No. 12/365,294, filed on Feb. 4, 2009 and issued as U.S. Pat. No. 7,903,783, which is a continuation of U.S. patent application Ser. No. 11/773,735, filed on Jul. 5, 2007 and issued as U.S. Pat. No. 7,505,557, which is a continuation of U.S. patent application Ser. No. 11/343,747, filed on Jan. 30, 2006 and issued as U.S. Pat. No. 7,257,189, which is a continuation of Ser. No. 10/067,508, filed on Feb. 4, 2002 and has been abandoned, which claims priority to provisional application Ser. No. 60/308,510, filed Jul. 27, 2001, which is hereby incorporated by reference.

1. FIELD OF THE INVENTION

The field of the invention generally relates to x-ray inspection systems used for security purposes. More particularly, the invention relates to a method and system for testing and certifying operators of such systems.

2. BACKGROUND OF THE INVENTION

X-ray inspection systems, e.g., baggage scanners, are commonly used to detect and prevent the passage of prohibited items beyond a security checkpoint. Such x-ray inspection systems are typically used at airports, courthouses and other locations where security is necessary or desirable. These inspection systems guard against items such as weapons and explosives from entering the restricted area. Generally, objects are placed on a conveyor and pass through the system at which time they are x-rayed. An x-ray image of the object appears on a monitor and is viewed by an operator.

Regardless of the technology used in x-ray inspection systems, the performance of such systems in large part relies on the vigilance and skillfulness of the system operators who examine x-ray images of the contents of baggage on the system's video monitor. In turn, the vigilance and skillfulness of the system operators generally depend on the amount and type of training they receive. This is very important since operator performance is critical to the overall integrity of security inspection systems.

Traditional methods of training and certifying system operators have involved training and testing in a classroom environment, with the use of photographs, slide projectors and perhaps computer-generated images. For example, photographs of video monitor images showing a weapon or other threat have been used to educate system operators on how a threatening object might appear on the system video monitor. After receiving such classroom training, system operators have then typically been tested in the same classroom setting. However, a classroom environment for training and testing is typically very different from the actual setting in which operators must detect prohibited items for at least several reasons.

First, in the classroom environment, the system operator typically sits in a chair and looks at various photographs and other materials. This does not accurately replicate real life conditions whereby the system operator must continuously watch the system's video monitor, stop and start the system and deal with disturbances. Furthermore, real life conditions involving a steady stream of people passing through a security checkpoint at an airport, many of whom may be hostile because they are late for their flights, are not typically replicated in a classroom environment. So despite a system operator's passing a classroom test with high marks, that is no guarantee of good performance by that operator in the field.

Second, the classroom environment does not effectively teach or test the operator's vigilance, i.e., focus and attention span, over time. As noted above, the system operator's vigilance is integral to the ongoing success of the security inspection process. Indeed, high vigilance during the early portion of an operator's shift during which time no threatening objects pass through undetected does not excuse a decline in attention and focus during the later portion of that operator's shift during which time a threatening object passes through.

Third, other realities of classroom training further reduce its effectiveness. To this end, classroom training and testing may expose system operators to a smaller variety of images and threats than the operator would see in real life situations. Furthermore, the expense and logistics of classroom training generally result in less training and testing than should occur.

For these and other reasons, classroom-based training and testing is not an optimum or even reliable method of training, testing and/or certifying the operators of x-ray inspection systems. In view of these shortcomings, other training tools have been developed.

One such tool is Threat Imaging Projection (TIP) technology. With TIP technology, x-ray images of threat objects are generally merged into the image of non-threat baggage that are displayed on the system's monitor. The threat images are selected at random from a library of various types of prohibited items. An operator's performance in detecting threats, missing threats and creating false alarms (detecting what is believed to be a threat when there actually is no threat) are then recorded.

Initial TIP technology implementations were limited to simply blending x-ray images of threats into the stream of baggage images. If the operator detected the threat and activated the appropriate control, the threat object was erased and feedback was provided to the operator indicating that he or she had successfully detected the threat. However, such TIP implementations never adequately worked in the field.

For example, TIP technology could not be efficiently used at actual checkpoints because the images generated by the TIP technology for training purposes would generally be indistinguishable from true threats. Where the TIP technology was set up to be automatic, i.e., without input to help distinguish between test and true threats, operators often reacted to test threats as though a true threat actually existed. For example, an operator's detecting a test threat image representing a bomb has resulted in that operator calling a bomb squad. These types of events resulted in large costs, delays and inconvenience. Where human supervisors were used to overcome problems associated with automatic testing, the testing method still proved to be cumbersome and ineffective due to cost, logistical problems and potential coaching of the operator by the supervisor.

More recently, a TIP process was developed that was somewhat more successful to a limited degree. This more recent process: 1) employed automatic testing, 2) avoided the above-mentioned costs and delays by providing sufficient feedback to the operator to avoid the situation where a test threat was treated as a true threat and 3) recorded individual operator performance in detecting threats so as to track performance over extended periods.

However, there still existed no method for using the information provided by testing with the use of TIP technology in order to certify operators. Indeed, varying uses and interpretation of the data in different segments of the security inspection industry results in varying levels of system operator proficiency and hardly any type of uniform certification method. Accordingly, there exists a serious need for a structured, uniform process for certifying system operators.

3. SUMMARY OF THE INVENTION

The current invention generally involves a method and system for using TIP technology and the operator testing data it generates in order to certify operators and thereby assure an acceptable and uniform level of operator performance. More particularly, a method and system is described in which the operator views x-ray images of objects on a screening system equipped with TIP technology. The system is capable of recording, storing and transmitting individual operator performance data relating to detections, missed detections or false alarms.

In another aspect of the invention, the method and system provide a means to track the types of threats a system operator has seen and detected, as well as the difficulty of the threats the operator has seen. To this end, the system contains a library of various threat images, e.g., guns, bombs, knives, etc., which are classified according to type of threat and difficulty of detection.

In another aspect of the invention, the method and system provide a means for reporting the operator's performance in successfully detecting test images to the appropriate authority, e.g., civil aviation authorities, airlines and other pertinent organizations. To this end, the system records the results of the operator's performance in a database. These results are then compared to the certification criteria that may be contained in another database to determine whether or not the operator should be certified. Results are reported to appropriate authorities or other organizations.

In another aspect of the invention, software is provided to accomplish the foregoing. More particularly, software is provided to encode images and aid in their comparison to real threats. Software is also provided such that the information contained in the above-referenced (and other) databases may be accessed and used for training and certifying operators.

5. DETAILED DESCRIPTION OF THE PREFERRED EMBODIMENTS

The preferred embodiments will now be described with respect to the drawings. To facilitate the description, any numeral identifying an element in one figure generally represents the same element when used in any other figure. The configurations shown in the figures are for illustrative purposes only, and are not intended to limit the scope of the current invention.

A. Description of System Elements

Figure 1:
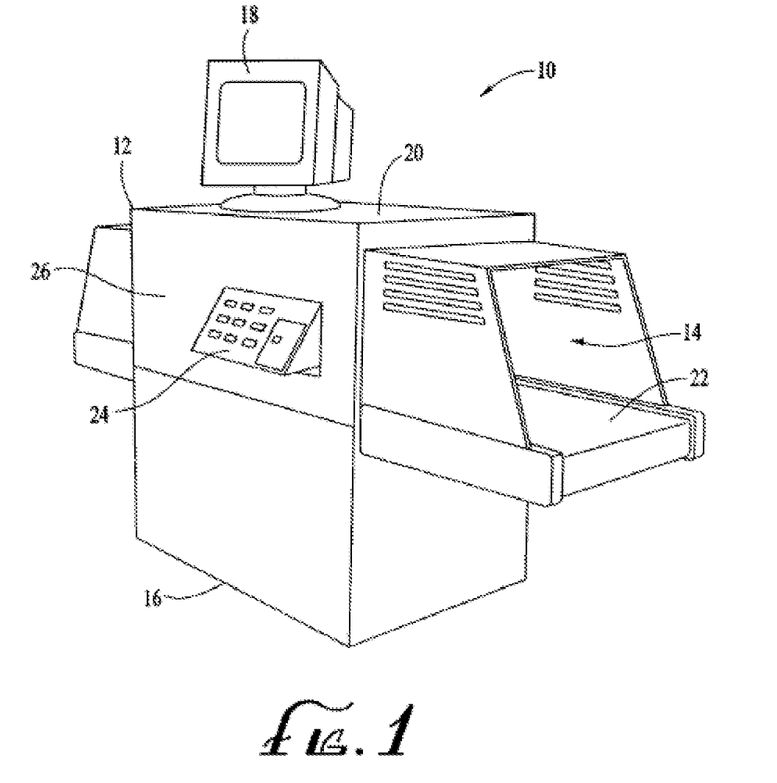
FIG. 1 is a perspective view of the system of the current invention.

FIG. 1 is a perspective view of an x-ray screening system 10 that includes a housing 12 containing a screening section 14 through which objects to be screened are passed. Screening section 14 may generally comprise a tunnel through which objects pass, and may include an active area where objects are X-rayed and tunnel-like extensions on either side of the active area. The tunnel may reflect different cross-sectional shapes.

The housing 12 preferably includes a flat base section 16 so that the system 10 may readily rest on a flat surface. A video monitor 18 for displaying x-ray images of objects located inside the screening section 14, and for displaying electronically inserted threat item images, may be attached to a top section 20 of the housing 12. The system 10 preferably includes a conveyor 22 for transporting objects through the screening section 14.

An information input device or means, shown in this embodiment as a keyboard 24, is preferably attached to a front section 26 of the housing 12. The input means 24 preferably allows an operator to log onto and off of the system 10, to control the conveyor 22, to indicate when the operator believes that a threat item image appears on the monitor 18, and/or to perform various other functions. The input means 24 may alternatively be a touch-screen system, wherein an operator touches images on a video screen to perform various operations, a voice-activated system, a mouse whereby icons are clicked onto, or any other suitable input mechanism to facilitate performing the various functions of the current invention. Alternatively, multiple input mechanisms may be used in conjunction with one another to allow an operator to perform various procedures.

The elements of system 10 may be arranged in several different configurations, and a greater or lesser number of elements may be used in the system 10. Accordingly, FIG. 1 is not intended to limit the invention to the specific configuration shown.

Figure 2:
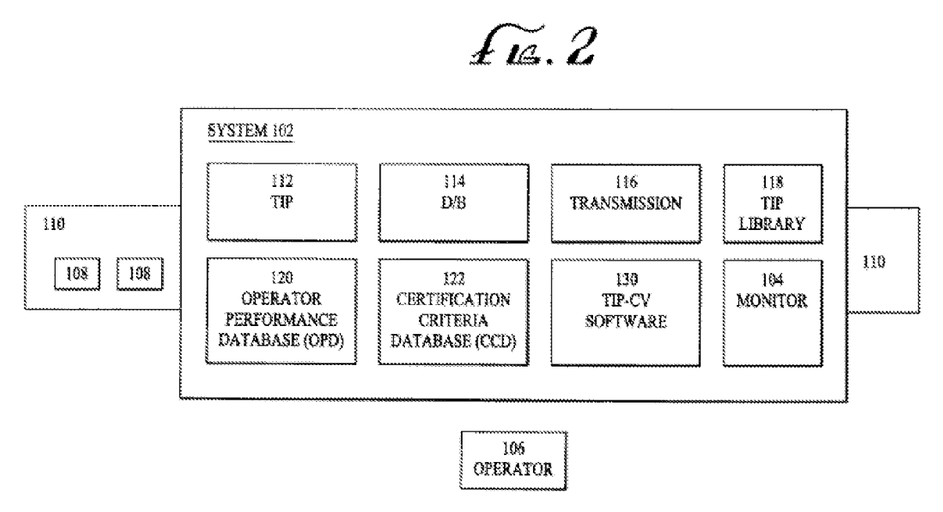
FIG. 2 is an overview schematic of the system of the current invention.

FIG. 2 shows a schematic view of an x-ray screening system 102 containing a video monitor 104 that displays x-ray images of objects 108 to an operator 106. Certain elements in FIG. 2 are generally similar to elements in FIG. 1 but may be referenced by different numerals. Typically, objects 108 pass through system 102 on a conveyor 110. As discussed below, the current invention involves various databases for providing, storing and transmitting information. Existing types of databases and means for providing communication between such databases may be used with the invention.

The configuration shown in FIG. 2 is for illustrative purposes only. For example, FIG. 2 depicts different databases, software and other items separately. However, a number of these items may be combined, e.g., one database may contain different types of information and/or software. Accordingly, FIG. 2 is not intended to limit the invention to the specific configuration shown.

Screening system 102 is preferably equipped with TIP technology 112 so that images of various prohibited items may be electronically inserted into the normal ongoing stream of non-threat images, e.g., passenger baggage, of objects 108 viewed on monitor 104. The non-threat images may be images of actual objects 108, or alternatively, may be electronically generated images. Thus, an operator may be trained on the screening system 102 without having to use any real objects. In FIG. 2, TIP technology 112 is simply shown as a box within screening system 102, but it will be apparent to one skilled in the art that suitable software and electronics are associated with TIP technology 112.

Screening system 102 preferably also includes a database 114 to store general information associated with TIP technology 112. Database 114 may also encompass other databases discussed herein, and to this end, FIG. 2 is for illustrative purposes only. Screening system 102 also preferably includes a data transmission means 116 to transmit operator performance data (and other data) for data collection and reporting purposes. In FIG. 2, TIP database 114 and transmission means 116 are shown separately from TIP technology 112, but these items may generally coincide.

System 102 also preferably includes TIP library 118 that may contain images of various prohibited items such as guns, bombs, knives, etc. TIP library 118 preferably contains a database defining the threat types (i.e., defined as a gun, bomb, etc.) and the difficulty associated with detecting each type of threat or each image orientation. For example, certain types of weapons such as Improvised Explosive Devices (IDEs) are generally considered more difficult to detect than weapons such as handguns and will thus have a higher difficulty rating. TIP library 118 may also contain images of what may be thought of as ordinary items, but in reality may be used as weapons, e.g., box cutters, personal knives, blades for shaving, etc.

The difficulty associated with detecting a given threat may also depend on its orientation or angle of view as projected on the monitor 104. For example, a handgun is generally considered more difficult to detect when viewed from behind, wherein it may appear to be a simple rectangular piece of metal, as opposed to when viewed from the side, wherein the well known shape of a handgun is more readily apparent.

It is preferred that TIP library 118 contains a sufficient number of different certification images to prevent memorization by the operator, which would skew any testing or certification effort. It is also preferred that the certification images contained in TIP library 118 be kept secret or otherwise confidential in order to prevent operator cheating. To this end, the certification images stored in TIP library 118 may be changed from time to time to maintain the integrity of the certification process.

The images contained in TIP library 118 for certification purposes are preferably approved and regulated by the appropriate certifying body such as the FAA. In this manner, the current invention may provide a uniform certification process for system operators. The images are also preferably graded according to difficulty of detection. For example, the FAA currently recognizes various threat classes and each class is generally associated with a certain difficulty level. As discussed in more detail below, the invention contemplates that an operator would need to be able to sufficiently detect images from each level of difficulty in order to become certified.

The database in TIP library 118 also preferably defines the type of images that the TIP capability 112 will provide for viewing by the operator. To this end, images may generally be classified as certification images or training images. Certification images are generally those images used during a certification testing procedure, a given percentage of which an operator must preferably detect to become certified or retain certification. Training images may be similar to certification images in appearance, and are generally used to train operators to detect various threats. However, training images may differ from certification images in that they portray images of different threat objects or images of the same threat object but viewed at a different angle or orientation.

Certification images and training images may be kept separately in different libraries. To this end, TIP library 118 may contain multiple sub-libraries in which the respective types of images are separately contained. Alternatively, two separate TIP libraries (not shown in FIG. 2) may be maintained for this purpose. Maintaining the training and certification images separately preferably allows a training period or certification period to be more readily set up.

The parameters of a given training or certification period (referred to generally as a testing period) are preferably set by an authorized user, such as a manager of a scanning company or an appropriate certification authority. These parameters are generally referred to as test scripts, because they "script" a test that will be administered to one or more scanner operators. In a preferred scenario, standardized test scripts may be used across the security industry, or segments thereof.

In order to set the test scripts for a given testing period, an authorized user logs onto the system and enters an ID and password provided by the appropriate authorities. After the authorized user logs on, a menu preferably appears, such as the on-screen menu shown in FIG. 3, from which the user may select a desired operation, which, in the case of setting test scripts, may be a 'TIP Configuration' operation 190. Other operations may include system maintenance 191, importing/exporting databases 192, uploading new TIP images 193, downloading TIP reports 194, viewing TIP reports 195, viewing access reports 196, and any other suitable operations described herein. A 'log out' option 197 is also preferably included on the menu. Once the 'TIP Configuration' operation is chosen, the authorized user may take the following steps to set the test scripts for a given testing period.

Figure 3:
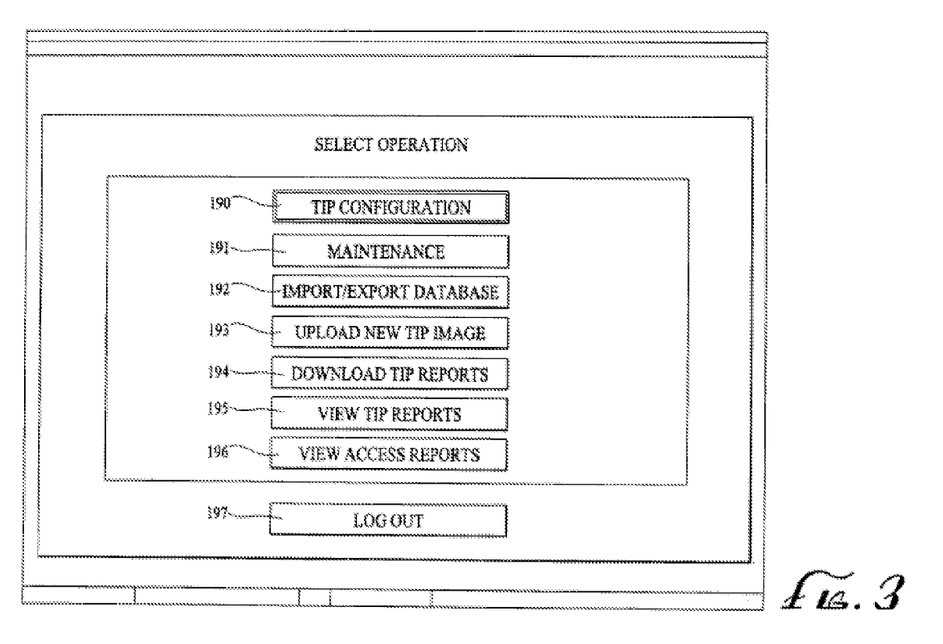
FIG. 3 is an on-screen view of a system operations menu.

First, a period unit of 'DAY' or 'MONTH' may be chosen, preferably from a drop-down list appearing on the video monitor 18. If a period unit of DAY is chosen, the start date of the testing period may be set for the current date or a future date. If a period unit of MONTH is chosen, the start date is preferably set for the first day of the current month or of a future month. If a start date is set that falls on a date prior to these specified acceptable start dates, a warning message may be displayed and the user may then modify the start date.

Next, a period length may be chosen, preferably from a drop-down list, or by entering a number corresponding to the desired period length via the keyboard 24. The period length is generally the length of time that the testing period will run. If a period unit of MONTH is chosen, and a period length of 'two' is entered, the test will run for two months. If a period unit of DAY is chosen, and a period length of 'two' is entered, the test will run for two days.

In a preferred embodiment, an option to repeat the test may be given. If the authorized user, or scanner operator (if the operator is given such authority), chooses to repeat the test, then the test may be administered over the previous period length, or until a new test is scheduled, which preferably overrides the repeat test. For example, if the testing period is two months, and the user chooses to repeat the test, then the test will be repeated over the next two months, or until the date that a new test is scheduled to start within that two month period, at which time the new test preferably overrides the repeated test. In a preferred embodiment, two testing periods may not overlap one another in a given system 10.

A pass percentage, which indicates the test score that an operator must achieve to obtain certification as a scanner operator, is also preferably set, either via a drop-down list or by entering a percentage number via the keyboard 24. The pass percentage may range from 1 to 100. Additionally, a description including any information relevant to a particular test may optionally be entered by the authorized user via the keyboard 24.

The library containing certification images may also contain information pertaining to the detail of, or difficulty level in identifying, each certification image. The library containing training images may generally contain more images to allow operator training with a variety of images on which to gain experience. The library containing training images may not necessarily specify difficulty levels associated with each training image.

A certification image list for a given test, or set of tests, may be created or "scripted" by selecting threat item images from a general source threat list and moving or dragging the selected items to the certification image list via a mouse connected to the keyboard 24, or via any other suitable method. In a similar manner, threat items may be removed from the certification image list and placed back into the general source threat list. Once the test scripts for a given test, or set of tests, are established, the user may save the test scripts in the system memory by clicking on a 'Save Test' icon displayed on the video monitor 18, or by any other suitable data saving method.

Training images may be used during a certification test, i.e., they may be randomly merged into the stream of baggage images, to keep operators alert and prevent them from memorizing which images are certification images. This generally allows system 102 to provide a mix of images having varying difficulty levels. By providing both training and certification images to the operator during certification, the operator preferably does not rely solely on his or her memory of what the certification images may look like. However, training images are preferably not used as images that will actually count towards certification since operators may come to memorize training images during the training process.

Screening system 102 also preferably includes an operator performance database (OPD) 120. OPD 120 preferably contains comprehensive records of test results and performance data for each individual operator 120 that operates system 102. Information that may be stored in OPD 120 may include the date and time of each test, the type of image (along with its difficulty) presented to the operator, and the operator's test results, including whether the operator achieved a score at or above the specified pass percentage. To this end, information regarding the operator's 106 detections, non-detections, and false alarms, as well as the amount of time an operator spent evaluating a particular image(s), may be stored in OPD 120. Grades for the operator's 106 performances may also be stored in OPD 120. It should be noted that other information pertaining to operator performance may also be stored in OPD 120.

There may be different levels or classes of certification requiring various different levels of proficiency and/or experience. Accordingly, the operator's 106 levels of proficiency and experience over time may also be stored in OPD 120. OPD 120 thus preferably provides information on the operator's progress over time. This allows evaluation of how an operator or group of operators perform or progress over time.

Where applicable, system 102 may also serve to promote an operator 106 to a higher level of certification by virtue of the information in OPD 120 reflecting that operator's performance. In this manner, system operator 106 may be allowed to operate system 102 at times or during conditions requiring this higher level of certification. To this end, system 102 may compare the operator's log in information to the information stored in OPD 120 to determine whether the operator is indeed certified to operate system 102 at that time or during the existing conditions. Accordingly, the current invention preferably provides a safety check to ensure that properly certified operators are operating the system 102 at appropriate times.

Screening system 102 also preferably includes a certification criteria database (CCD) 122 which may generally contain and set forth requirements for operator certification. To this end, CCD 122 may set forth different sets of requirements that are required to obtain different types of certification. As such, CCD 122 may specify the number of images, types of images and levels of difficulty of images that must be successfully detected by an operator 106 during a certification test. CCD 122 may specify the length of time over which a certification test is to be conducted or the maximum time allowed for an operator 106 to complete a certification test. CCD 122 may set forth the frequency of testing necessary to maintain certification. CCD 122 may also specify the criteria for determining whether an operator's performance constitutes an acceptable/certifiable performance (success criteria).

It is preferred that CCD 122 set forth requirements that are uniform for a given industry or application. For example, with certification for airport baggage scanner operators, it is preferred that criteria contained in CCD 122 be uniformly used to ensure a minimum certification level throughout the industry. Such uniform criteria may be specified by the appropriate authority such as the FAA or other civil aviation authority.

The criteria contained in CCD 122 may also be changed over time to reflect changes in desired certification requirements. For example, should a new type of weapon come into being, the certification criteria stored in CCD 122 may be revised to include that image as part of the images to be seen by operators during the certification process. In this situation, TIP library 118 may also be updated to include this new type of image as a training and/or certification image.

System 102 also preferably includes software 130 that accesses information contained in the various databases described above and that analyzes operator performance during testing and certification. In FIGS. 1-2, software 130 is referred to as Threat Image Projection-Certification Version software (TIP CV), though this name is not intended to limit the scope of the invention. More particularly, certification software 130 may access information in the various databases, receive and record information about operator performance, analyze operator performance and provide reports thereon.

To accomplish the foregoing objectives, certification software 130 may perform various functions. For example, software 130 may control which images are presented to the operator 106 from TIP library 112. This may be accomplished via the test scripts inputted by a user, as described above, or through a random selection of images. It is preferred that a sufficient number of images from varying levels of detection difficulty are presented to the operator so as to render the training and/or certification meaningful. To this end, software 130 may retrieve certification images from TIP library 112 according to the criteria set forth in CCD 122. And as mentioned above, these criteria may change over time.

Certification software 130 may also control the timing of the images presented to the operator 106, via the test scripts inputted by a user or via a random timing method. In other words, software 130 may control the timing of when various training or certification test images are inserted into the normal stream of images viewed by the operator 106. For example, software 130 may insert several training or certification test images in a row, near each other or at a time apart from each other. This preferably enhances the training and certification capability of system 102 by simulating the randomness by which threats may pass through system 102 in real life.

Software 130 may also ensure that the appropriate number of certification images are shown to operator 106 within the time period specified in CCD 122 for that type of certification. This may occur by increasing the frequency of test images displayed to the operator as the end of the test period nears, if necessary.

Software 130 may also record whether an operator 106 successfully detects or does not detect the training or test images as well as how much time an operator 106 spends evaluating these images. Based on such information, software 130 may determine whether a given operator's performance is acceptable. For example, for certification purposes, software 130 may determine whether the operator's performance was sufficient for that operator 106 to become certified or maintain his or her certification level.

Software 130 may also provide a reporting function on the operator's performance to the operator and/or the appropriate authorities, as further described below. For training purposes, software 130 may provide information on which training images were successfully detected or not detected, and may also provide recommendations for further training so as to increase the operator's performance in the future. This type of reporting function may help provide for uniform training standards in a given industry.

For testing and certification purposes, software 130 may provide a report indicating the operator's test score and whether the score suffices for certification. This may occur by a comparison of the operator's performance information that may be contained in OPD 120 to the certification criteria contained in CCD 122. Software 130 may also provide a description of what types of images were successfully detected or not, and thus provide information on the areas needing further work by the operator. This reporting function may also help serve to establish uniform testing guidelines in an industry.

In determining whether an operator should be certified, software 130 may supplement the image and associated difficulty level. Instead of just considering the image and level of difficulty in and of themselves, software 130 may analyze the entire image displayed to the operator containing the threat image as well as its surroundings. This may occur because a certification image that is normally easy to detect may be made difficult to detect when placed in a certain location within the ongoing stream of non-threat baggage. This may also occur when an image is not projected well on video monitor 104 due to insufficient x-ray penetration of the baggage, the image into which the certification image was merged.

As a result, an operator may fail to detect an otherwise easily detectable image and may be graded more harshly than he or she should have been. By supplementing the level of difficulty assigned to a given certification image with an analysis of the context in which that image is place, the software 130 may more accurately evaluate an operator's abilities.

B. Description of Training and Certification Processes

Figure 4:
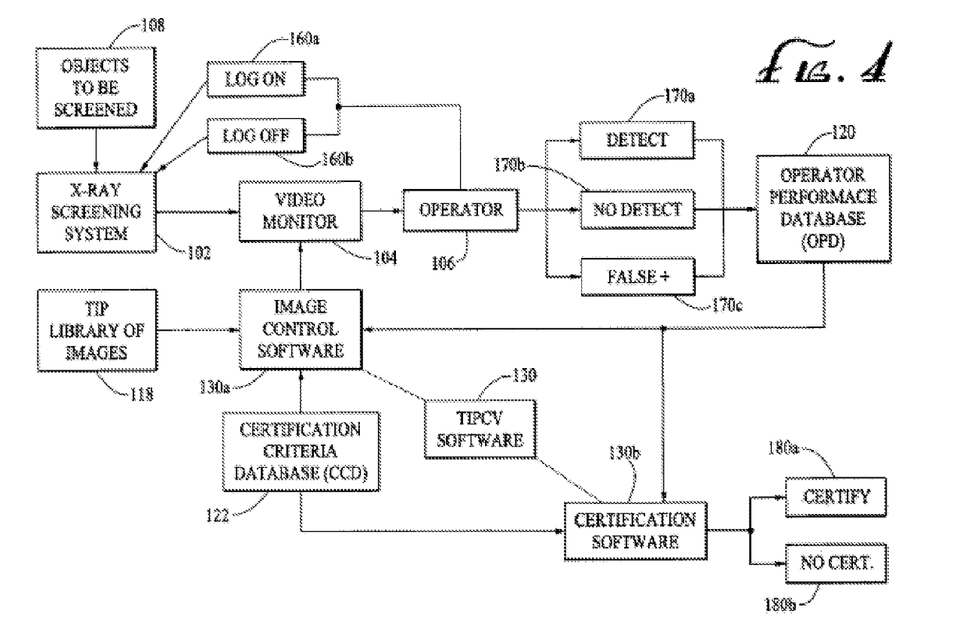
FIG. 4 is a flowchart/schematic of a preferred embodiment of the training or certification process wherein the flow of information to and from each element of the invention is illustrated.

The process of training and certifying system operators is now discussed in more detail with continued reference to FIG. 2, but also with reference to FIGS. 3 and 4. FIGS. 3 and 4 are schematics generally depicting the training and certification method of the invention. The configuration shown by these figures is not intended to limit the scope of the invention.

As indicated above, the system and method of the current invention may provide for uniform training and certification throughout an industry. The current invention also provides for regulation of the certification process to avoid cheating. And because the information contained in the various databases may be changed to reflect changing conditions and requirements facing operators, the current invention provides for flexibility in the certification process.

In one embodiment of the invention, an operator may be randomly tested for certification purposes while generally performing his or her screening duties. That is, any time the operator is screening baggage or other objects, a test or certification process may occur. This may occur with or without the operator's knowledge. Where the testing or certification occurs without the operator's prior knowledge, the situation is avoided whereby an operator maintains focus and attention only when a known testing period is occurring.

However, there may be situations where the operator is advised in advance that the screening system 102 will be providing images to the operator and/or recording operator performance. For example, system 102 may provide training images so that the operator may be trained on how to detect or not detect certain threats. In this situation, it may be preferred to advise the operator in advance that the system will be providing training images in order to allow effective and constructive training. Once sufficient training has occurred, however, the operator may be randomly tested without prior knowledge that a test is to occur.

An operator may log into screening system 102 as shown in step 160a at the beginning of his or her screening shift, training period, testing period or other period during which the operator is operating system 102. Suitable identification and password information may be issued to each operator for the logging in process. In this manner, system 102 may record the identity of the operator who is performing the screening duties at a particular time. The identification and password method of logging in also helps to avoid cheating in the training and certification process. For example, it preferably prevents a more skilled operator from filling in for a less skilled operator. In similar fashion, operator 106 may log off from system 102 as shown in step 160b.

Upon an operator logging on to system 102, software 130 may acknowledge the identity of the operator who will be viewing the images. In this manner, information in OPD 120 may determine whether the operator logging at the time is certified to operate system 102. It should be noted that it is not absolutely necessary for software 130 to acknowledge the operator's identity for training or testing to occur. Also, it is not absolutely necessary for the operator to log on for software 130 to provide images. Accordingly, it is not intended that the invention be limited as such.

Some or all of the screening systems 102 in a given facility or facilities, may be networked so that a given operator 106 can log on to any screening system 102 on that network. Some or all of the screening systems 102 may have access to the relevant databases so that a training session, certification test or portion of a certification test could be conducted at different screen system 102 locations. This provides flexibility in that a given operator could be assigned to different screening systems 102 during a certification test without affecting the certification process. Similarly, the problem of having only one screening system 102 in a facility that is capable of certifying a given operator 106 is avoided, as is the situation where operators maintain focus and attention only when stationed at that particular system 102.

Software 130 may provide training and/or testing images depending on the circumstances. For example, software 130 may access CCD 122 to determine which images should be shown according to the specified criteria, and then access TIP library 118 to access the desired images to provide to operator 106. As shown in FIG. 4, the portion of software 130 that interfaces with TIP library 118 is generally referred to as image control software 130*a*.

When system 102 is being used for training purposes, image control software 130*a* may access a broad range of images which allow the operator to become familiar with all types of images that might be encountered later on during testing and certification, as well as in real life. The length of a training session may be controlled by software 130, preferably via the 'period unit' and 'period length' test scripts that are entered by an authorized user, as described above. In this manner, system 102 may be able to correlate the amount of training with the operator's later success when being tested.

In the testing environment, it may be preferred that certification testing of an operator 106 occurs over a set interval of time whereby test images are provided for viewing on monitor 106. The length of the test interval may be specified in the certification criteria database 122, or via the 'period unit' and 'period length' test scripts entered by an authorized user. In this manner, testing for certification may achieve better uniformity because operators that are not efficiently able to correctly identify test images will not have some indefinite period of time to do so which itself would indicate that the operator is not worthy of certification.

When system 102 is being used for certification purposes, the images accessed by image control software 130*a* and provided to the operator 106 may be determined by the criteria contained in CCD 122. The images to be provided to operator 106 may be set forth in a pre-selected list or script file which may be randomized by software 130*a*. This preferably helps to prevent memorization and/or sharing of the specific test sequence of images.

Software 130 may also generate automatic test sequences using criteria specified in CCD 122 such as the types of images, number of images, frequency of projection and length of test. That is, criteria may be used that call for certain types of images, a certain number of images and the frequency at which they are shown. Software 130 may then use these criteria to automatically generate a test sequence having a string of certification images according to these criteria.

Automatic generation of test sequences preferably reduces the burden of having to pre-program a certification test sequence of images. Indeed, by creating multiple groups of test sequences with varying difficulty levels, system 102 simplifies the task of generating image lists for appropriate certification levels.

Once an operator 106 has completed a test sequence, the software 130*a* may automatically select a different test sequence for the next test. These subsequent sequences may be controlled by an appropriate certification control office or by allowing software 130*a* to automatically generate a random subsequent test sequence that has not been previously seen by the particular operator 106.

As mentioned above, it is preferred that certain images of certain difficulties are provided to the operator 106 when testing for certification purposes. For example, it is preferred that during a testing/certification interval, at least one image of each type of image requiring certification appears on the monitor. To this end, image control software 130*a* may first access CCD 122 to retrieve the pertinent certification regulations and protocols, and for instructions on which images to access from TIP library 118.

Thereafter, image control software 130*a* may provide the testing images to the operator based on these instructions. In addition to the type of images provided, image control software 130*a* may also receive instructions on the frequency that each test image will be provided to the operator 106. In this manner, the test images viewed by the operator 106 may be varied to simulate real life conditions.

As the operator 106 views the monitor 104, images from TIP library 118 appear. In the training situation, it may be that various training images appear one after the other so as to allow the operator 106 to become familiar therewith. In the testing and certification situation, test images may be inserted into the ongoing stream of non-threat baggage or other objects.

As the operator 106 views the stream of images on monitor 104, he or she will generally detect (170*a*), not detect (170*b*) or falsely detect (170*c*) what are (or are not) believed to be threat images. The operator's 106 responses, i.e., detect 170*a*, no detect 170*b* or false detect 170*c*, are preferably recorded in the operator performance database 120 via software 130. Software 130 may use this performance information in various ways.

For example, the information recorded in OPD 120 may be evaluated by a portion of software 130 that is designed to do so. In FIG. 4, this portion of software 130 is referred to as certification software 130*b*. Overall, certification software 130*b* may be used to compare the information recorded in OPD 120 regarding the operator's responses to information contained in the CCD 122 that may set forth the correct responses.

CCD 122 may also set forth the minimum allowable standards for an operator to become certified or maintain his or her certification. Such minimums may be set by the appropriate authority. Images that are successfully detected may go towards meeting the minimum allowable standards. Upon making this comparison, certification software 130*b* may generally determine whether the operator passes 180*a* and thus becomes certified or maintains certification, or whether the operator fails 180*b* and thus does not become certified or loses certification. To this end, software 130*b* may take into account the circumstances surrounding the certification images. For example, if unusual difficulty surrounded the image such that it was more difficult to detect than would otherwise be, this may be taken into account so that the operator's performance is more accurately considered.

As another example, the information recorded by OPD 120 may be used to determine what further training the operator 106 should undergo. For example, software 130 preferably notes all the incorrect responses recorded in OPD 120. If it is seen that operator 106 has trouble detecting a certain type of threat image, after the training or testing interval has occurred, this information may be used to convey to an operator (or the appropriate authority) that further training is recommended on that type of image.

As another example, the information recorded by OPD 120 may be used during a certification interval that is then occurring. To this end, the certification criteria contained in CCD 122 may specify that a certain number of different types of images must be detected during the certification interval for that operator to pass. If, during the certification interval, the operator 106 fails to detect a certain type of image, this information may be recorded in OPD 120 and then used by software 130 to instruct the image control software 130*a* to provide another image of that type to the operator 106.

After a certification interval ends, certification software 130*b* generally advises whether the operator 106 passes 180*a* or fails 180*b*. If the operator 106 passes, he or she is preferably notified and thus need not undergo further testing until some time in the future. Indeed, the operator 106 may not be aware he or she was being tested until being made aware that he or she passed. As mentioned above, subsequent tests are preferably scheduled in a quasi-random manner so as to maintain operator vigilance.

The scheduling of subsequent tests may occur per the criteria in CCD 122. To this end, certain operators may need to be tested more frequently than others. Accordingly, it is preferred that system 102 keep track of the type of operator that is operating the system so that he or she is tested frequently enough.

If operator 106 fails, operator 106 is again preferably notified of the failing result. This may result in various events. For example, operator 106 may be placed on some type of probationary status. Alternatively, operator 106 may fail to become certified (or may become decertified) and thus be precluded from operating system 102 for the time being. It may be that several failing grades in subsequent attempts to become certified, or consistently low scores when attempting to maintain certification, results in the operator being given other job assignments.

As another example, the results recorded in OPD 120 may be used to determine whether a given operator 106 is permitted to log on and operate the screening system 102. If an operator has not achieved or maintained certification, the operator may be prevented from logging on to and operating the screening system absent the intervention of a supervisor. Similarly, if, during the course of a certification test, an operator 106 fails to detect a certain number of certification images such that the operator 102 cannot pass even with a perfect performance from that point on, the operator 106 may be automatically logged out and prevented from further operating the screening system 102 absent intervention by a supervisor.

As another example, the results recorded in OPD 120 may be used to create an individualized training regimen for a particular operator 106. By determining the strengths and weaknesses of each operator 106 based on the type and difficulty of each image that was not detected, software 130 may then be used to formulate a training regimen that emphasizes those types of images with which operator 106 had difficulty. In other words, system 102 may provide a training program that is tailored to address a particular operator's weaknesses. This in turn may lead to a passing score on the next certification attempt, as well as a better trained operator work force.

As another example, the results for various operators 106 that are recorded in OPD 120 may be evaluated to determine trends in detection. To this end, if a significant number of operators 106 have difficulty detecting a certain type of threat image, this information may be used to institute industry-wide training on this type of threat. Other types of trends may also be determined by evaluating the information contained in OPD 120.

To achieve this goal, software 130 preferably provides a reporting function by accessing and manipulating data contained in TIP library 118, OPD 120 and/or CCD 122 to provide desired information. To this end, software 130 preferably includes various types of filters so that authorized users may extract certain types of information from the various databases in a format that provides useful reports. Such reports may include threat detection percentages by category, individual screener performance summaries, performance comparisons of multiple screeners, and any other suitable information for evaluating system and operator performance.

The 'threat detection by category' reports preferably include the following fields:

the name and ID number of each selected screener;
the dates on which each screener underwent testing;
the time within a test at which each image appeared;
the threat category (e.g., gun, bomb, etc., which will be the same for each item in a 'threat detection by category' report);
the subcategory of each threat, i.e., conventional or otherwise;
the threat description (e.g., the specific gun model or bomb type);
the decision outcome, i.e., whether the threat was identified ("hit" or "miss");
the recognition time for each identified item, i.e., the amount of time that elapsed before the screener identified the threat;
the total recognition time for all the threats from a testing period; and
the average recognition time for all the threats from a testing period.

The 'individual screener performance summary' reports preferably include the following fields:

the name and ID number of a selected screener;
the airport and terminal where the screener underwent testing;
the date each report was created;
the number of shifts worked by the screener;
the number of bags screened by the screener;
the number of certification images presented;
the number of certification images properly identified;
the number of certification images missed;
the percentage score of properly identified items;
the total and average daily performance of the screener; and
whether the screener passed or failed a given test.

The 'screener comparison' reports preferably include the following fields:

the name and ID number of each selected screener;
the number of shifts that each screener worked;
the number of bags screened by each screener;
the number of certification images presented to each screener;
the number of certification images properly identified by each screener;
the number of certification images missed by each screener;
the percentage score of properly identified items for each screener;
whether each screener passed or failed a given test;
the grand total of properly identified items for all selected screeners; and
the average performance of all selected screeners as a whole.

The TIP reports may be downloaded by clicking on the 'Download TIP Reports', or similar option, from the main menu. The 'threat detection by category,' 'individual screener performance summary,' 'screener comparison' and any other suitable reports may be downloaded individually, or all of the reports may be downloaded together. To download the reports, a test period and a destination are preferably selected by an authorized user. For example, an authorized user may select all CV reports administered over a two month period from February 1 to March 31 in a given year, and choose to have those reports downloaded to a floppy drive, a zip drive, a hard drive, or any other suitable medium. If a test period and/or a destination is not selected, a warning message will be displayed, and the authorized user may then add the required information. The downloaded CV reports are preferably saved to the selected destination as text (.txt) files.

Certain aspects of the functionality provided by system 102 that have been mentioned above bear reiteration in this description of the testing and certification method. First, certification images are preferably approved and/or graded for difficulty by the appropriate authority. Second, certification images are preferably kept secret to avoid cheating by operators seeking certification. Third, it is preferred that certification images are sufficiently numerous to avoid memorization by the operators 106. To this end, certification images may be updated over time, but when this occurs, it is again desired that the appropriate authority approve and/or grade the new images.

Figure 5:
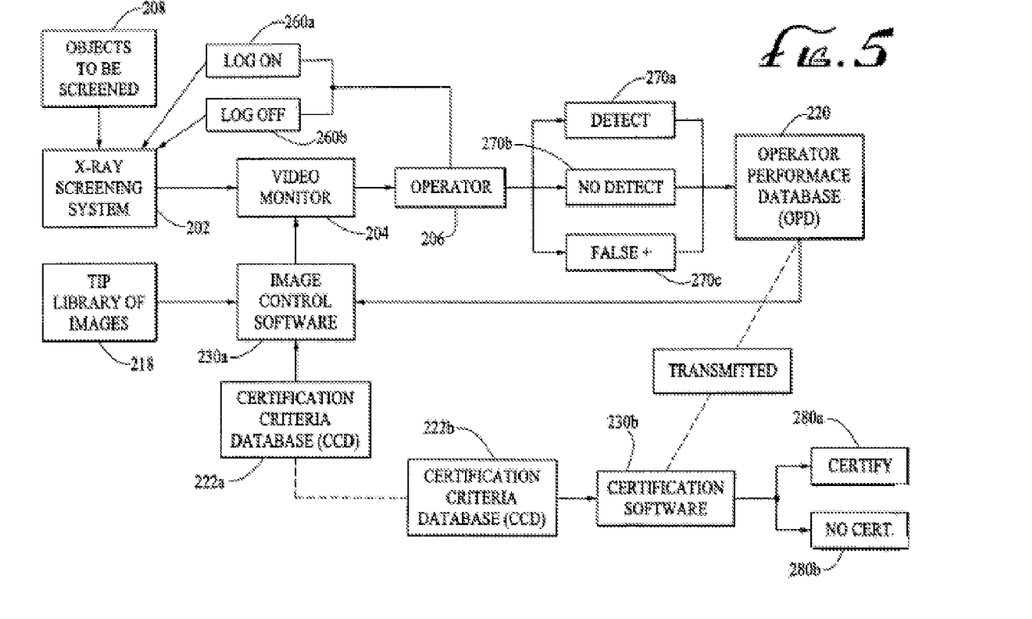
FIG. 5 is a flowchart/schematic of an alternative preferred embodiment similar to the one in FIG. 4, except that certain database(s), software and/or other system elements are located at a location remote from the inspection system.

Referring now to FIG. 5, an alternative embodiment of the current invention is shown wherein like reference numerals are used except that numerals in the 200s are used instead of the 100s as in FIG. 4.

In this embodiment, the certification software 230b may be physically located at a remote location away from screening system 202. Other elements described above may also be located remotely to system 102. In this embodiment, software 230b and other components of system 202 may be under the control of, and located at, the appropriate authority such as the FAA. As discussed below, this may allow the appropriate authority to have more control over evaluating operator responses 270a-c and determining whether operators become certified (or maintain their certification). This alternative embodiment is substantially similar to the embodiment of FIG. 4 but may differ as follows.

As shown by the dotted line, the operator responses 270a-c recorded in OPD 220 may be transmitted to certification software 230b located at the remote location via a global secure internet connection, a hierarchical network structure, a physical diskette, wireless transmission, or some other means of data transmission. The certification criteria database 222 may be present at both the location of the screening system 202 as well as the remote location. In this manner, CCD 222a located at the screening system 202 may be used to test an operator 206, while CCD 222b located at the remote location may be accessed when determining if an operator passed.

More particularly, image control software 230a may access CCD 222a as a factor in determining the timing and sequence of images to be displayed on monitor 208 during the certification process at the screening location. At a separate location, certification software 230b may compare the standards contained in CCD 222b with the responses recorded for each individual operator 206 as transmitted from OPD 220 in order to determine whether the individual operator 206 should be certified 280a or not certified 280b. This alternative configuration preferably allows the governing body more direct control of the certification process. As shown by the dotted line, updating one of CCD 222a or 222b may result in the updating of the other of CCD 222b or 222a.

Figure 6:
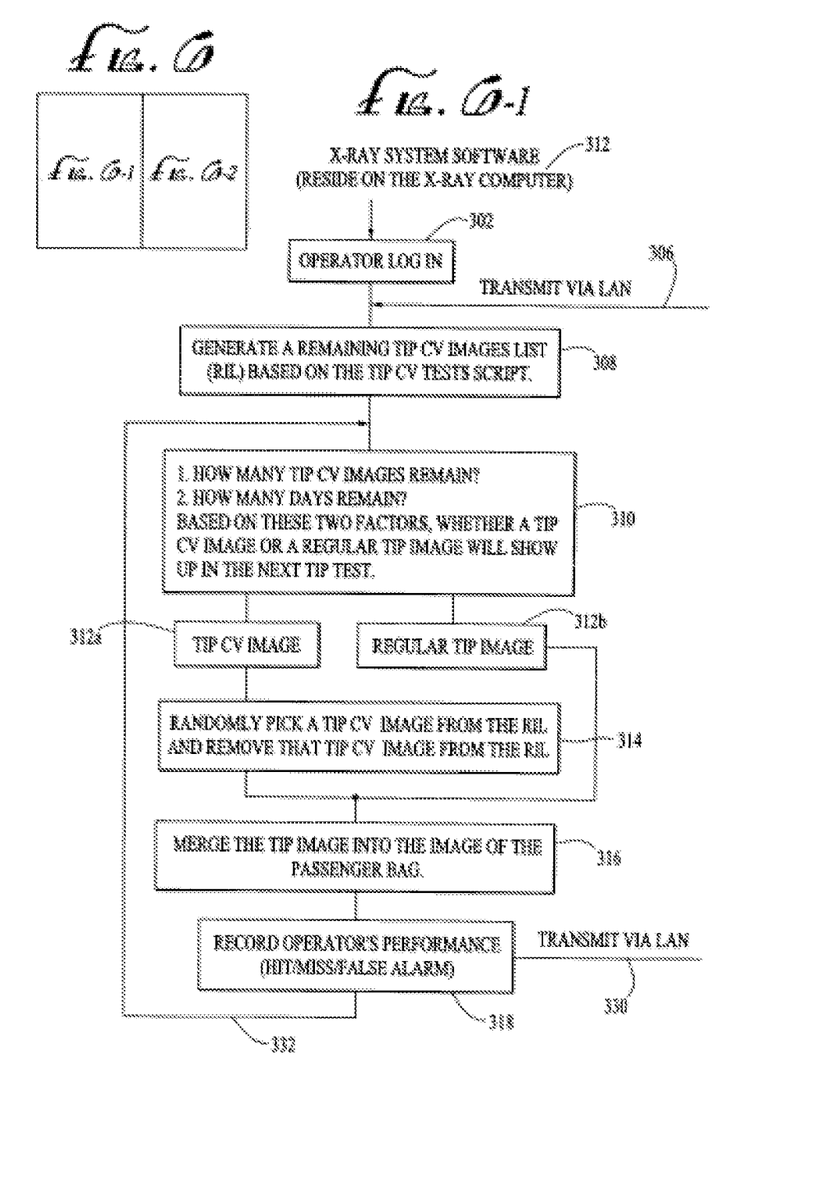
FIG. 6 is a flowchart showing a methodology of the software associated with the method and system of the current invention.

Referring now to FIG. 6, the functionality of software 130 and how it is used with system 102 is now further described. As shown, x-ray system software 312 may reside on a computer associated with system 102. Software 312 may generally be associated with the system's TIP capability (112 in FIG. 2) and is thus represented by the reference numeral 312 in FIG. 6. Certification software 330 (similar to software 130 and 230 in FIGS. 1-3) may reside on a server that has connectivity to system 102. Indeed, in a preferred embodiment, the current invention is used in a network environment.

Operator 106 may log onto system 102 as shown in step 302. As shown in step 304, certification software 330 preferably generates a certification test script containing various parameters such as the length of the testing period, the minimum score required to pass and the images to be used. During the testing period, some number of certification images may be shown to the operator 106 who must successfully detect some minimum number to pass. As discussed above, these parameters may vary according to criteria contained in CCD 322. Accordingly, there may be connectivity with OPD 320 in FIG. 6 when the test script is being generated as shown in step 304.

The test script may also vary according to the type of certification sought by operator 106. As also discussed above, the test script is preferably generated by software 330 automatically. Alternatively, however, test scripts may be programmed by the appropriate authority.

As shown in step 306, the certification test script 304 may be transmitted to system 102. Various types of transmission may be used, but in one embodiment, transmission may occur electronically over a local area network (LAN). It should be noted that the foregoing discussion is not intended to require that steps 302, 304 and 306 occur in a certain required order every time.

A certification test may then generally occur. The certification interval will begin and over time, the operator 106 may be shown both certification images and standard, or training, TIP images. As discussed above, both types of images may be provided to operator 106 to prevent memorization or sharing of the certification images. At some point after the start of the interval, the operator 106 will have seen some portion of overall number of certification images set forth from the test script 304.

A list of remaining certification images to be shown to operator 106 (remaining images list or RIL) is preferably generated as shown in step 308. RIL 308 may be generated at various points in the testing interval. In a preferred embodiment, RIL 308 may be generated each time operator 106 logs onto system 102.

As shown in step 310, queries may be generated as to how many certification images of the original number remain to be seen by operator 106, and how many days remain in the certification interval. Other queries may be generated. Based on these two (or other) factors, it is determined whether a certification image or a standard TIP image will be next shown to operator 106. To this end, for example, if there are few days remaining in the certification interval and there are a significant number of certification images that remain to be seen by operator 106, it may be that a certification image is more likely provided.

If the outcome of step 310 is that a certification image is provided as in step 312a, a certification image is preferably picked from RIL 308 at random as shown in step 314. In connection therewith, that certification image is preferably removed from RIL 308. If the outcome of step 310 is that a standard TIP image is provided as shown in step 312b, a certification image will not be removed from RIL 308 and step 314 is generally bypassed. Upon either a certification TIP image or standard TIP image being chosen, the TIP image is merged into the image of the image of the baggage as shown in step 316.

Thereafter, the operator's performance may be recorded as shown in step 318. The operator performance may generally comprise a detect, no detect or false alarm as discussed in connection with steps 170a-c in FIG. 4. The information reflecting the operator's performance may be transmitted to operator performance database (OPD) 320 as shown in step 330. As discussed above, it is generally preferred that the operator's performance on only the certification images count towards determining whether certification is obtained or maintained.

As the certification interval progresses, operator 106 will be shown more images in the manner described above. This repetitive process is shown by step 332. Generally, it is preferred that operator 106 has the opportunity to see all certification images during the certification interval. Alternatively, it is preferred that operator see at least a minimum number of certification images that would enable the operator to become certified.

As the operator's performance data is stored in OPD 320, it is compared with the information stored in CCD 322 to determine whether the particular operator passes. This comparison may occur multiple times until the certification interval is complete. To this end, query 334 may be generated on whether the testing interval is completed. If not, as shown in step 336a, additional comparison(s) between operator performance data in OPD 320 and certification criteria in CCD 322 will occur.

When the certification interval is complete as shown in step 336b, the operator's overall performance will be assessed according to the minimum score requirement set forth in the test script 304. If the minimum score is achieved, operator 106 becomes certified or maintains certification as shown in step 380a. Alternatively, if operator 106 does not meet the minimum score, certification is not obtained or may be lost as shown in step 380b.

In an alternative embodiment, the screening system 102 is incorporated into a checkpoint wherein various types of other information generated by other screening methods or devices are recorded to supplement the information described above. In locations such as airports, x-ray screening systems are generally used in combination with metal detectors, where the x-ray screening system is used to detect threats contained in baggage and the metal detector is used to detect threats concealed by people under clothing, etc.

The alarms on metal detectors may be activated by a significant percentage of people passing through checkpoints, requiring further inspection. Other methods and devices may also be used to detect threats and the information generated by their use may also be used to supplement the information described above.

By recording the number of people and bags that pass through a checkpoint as well as the number of detections by the metal detector, a more complete measure of the total activity at that checkpoint may be ascertained. Accordingly, the current invention preferably includes databases and software to record, store and report on the volume of people passing through a checkpoint as well as the number of detections made by the metal detector(s) (or other detection devices) at that checkpoint. It is also preferred that the metal detector and/or other detector information may be transmitted over a network in similar fashion to the certification information described above. This other detection information may be incorporated with the certification information to provide an overall picture of operator performance.

This activity may be compared with operator performance data from the OPD 120 to determine the effect of overall checkpoint activity levels on operator performance. For example, operator performance may suffer during periods of increased activity at a checkpoint due to distraction. As such, this information may be used to determine a minimum number of personnel at a given checkpoint for given activity levels in order to maintain a specified level of threat detection by operators 106.

Information relating to the amount of activity at a checkpoint may also be used to determine the timing of certification testing and the timing of the display of threat images during certification testing. For example, certification testing may be avoided during periods of high activity because of delays it may cause. Similarly, the number of certification images displayed during times of increased activity may be decreased in order to lessen delay and increase the flow of people through a checkpoint. Alternatively, the number of certification images displayed during periods of increased activity may be increased in order to test and certify an operator's performance under more difficult conditions.

While various preferred embodiments and configuration have been described above, the current invention is not limited to these exact embodiments and configuration. For example, various databases or software components separately described above may be combined. Accordingly, one skilled in the art will appreciate that variations may be made to the foregoing description without departing from the scope of the current invention.

What is claimed is:

1. A system for evaluating a performance of a security inspection system operator at a checkpoint, comprising:
   a non-transitory computer readable medium having stored thereon first values indicative of a number of people passing through said checkpoint;
   a non-transitory computer readable medium having stored thereon second values indicative of a number of detections made by a metal detector at said checkpoint;
   a non-transitory computer readable medium having stored thereon third values indicative of certification information specific to said operator; and
   a non-transitory computer readable medium having stored thereon a plurality of programmatic instructions for evaluating the performance of the operator based on said first, second, and third values.

2. The system of claim 1 further comprising a computer readable medium having stored thereon fourth values indicative of a number of detections made by a plurality of detection devices at said checkpoint.

3. The system of claim 2 wherein the performance of the operator is evaluated based on said first, second, third, and fourth values.

4. The system of claim 1 further comprising a computer readable medium having stored thereon a plurality of threat item images.

5. The system of claim 4 further comprising a computer readable medium having stored thereon a plurality of programmatic instructions for accessing the threat item images to display an X-ray image of at least one threat item image in combination with a baggage item, wherein said display provides the appearance that the threat item is located inside of said baggage item.

6. The system of claim 5 further comprising a computer readable medium having stored thereon a plurality of programmatic instructions for receiving an input from the operator, wherein said input indicates whether the operator has identified said at least one threat item image on the monitor.

7. The system of claim 6 further comprising a computer readable medium having stored thereon a plurality of programmatic instructions for determining whether said operator has detected a predetermined percentage of said threat item images and, depending on said calculation, producing a certification score.

8. The system of claim 4 wherein an orientation angle of each threat item image is associated with a detection difficulty level that is used in determining the third values indicative of certification information.

9. The system of claim 8 wherein the threat item images include images of at least one of bombs, knives, guns, or improvised explosive devices.

10. The system of claim 1 further comprising an X-ray machine located at the checkpoint, wherein said X-ray machine scans baggage possessed by an individual passing through the checkpoint and generates an X-ray image.

11. The system of claim 10 wherein the X-ray image is combined with at least one threat item image and shown to the operator as the baggage passes through the X-ray machine.

12. The system of claim 1 further comprising a certification criteria database, wherein said certification criteria database contains a plurality of requirements for operator certification.

13. The system of claim 1 further comprising a plurality of programmatic instructions for reporting the evaluation of the performance of the operator to an operator certification authority.

14. A system for evaluating a performance of a security inspection system operator at a checkpoint, comprising:
- an X-ray scanning system, wherein said X-ray scanning system scans baggage possessed by an individual passing through the checkpoint and generates an X-ray image;
- a metal detector;
- a computer readable medium having stored thereon first values indicative of a number of people passing through said checkpoint;
- a computer readable medium having stored thereon second values indicative of a number of detections made by the metal detector at said checkpoint;
- a computer readable medium having stored thereon third values indicative of certification information specific to said operator; and
- a computer readable medium having stored thereon a plurality of programmatic instructions for evaluating the performance of the operator based on said first, second, and third values.

15. The system of claim 14 further comprising a computer readable medium having stored thereon fourth values indicative of a number of detections made by a plurality of detection devices at said checkpoint.

16. The system of claim 15 wherein the performance of the operator is evaluated based on said first, second, third, and fourth values.

17. The system of claim 14 wherein the X-ray image is combined with at least one threat item image and shown to the operator as the baggage passes through the X-ray machine.

18. The system of claim 14 further comprising a certification criteria database, wherein said certification criteria database contains a plurality of requirements for operator certification.

* * * * *